March 10, 1931.  B. M. BROWNELL  1,795,541
PIPE JOINT
Filed April 2, 1927

Inventor:
Barnett Morse Brownell,
By Rippey & Kingsland.
His Attorneys.

Patented Mar. 10, 1931

1,795,541

UNITED STATES PATENT OFFICE

BARNETT MORSE BROWNELL, OF ST. LOUIS, MISSOURI, ASSIGNOR TO DIAMOND METAL PRODUCTS CO., A CORPORATION OF MISSOURI

PIPE JOINT

Application filed April 2, 1927. Serial No. 180,453.

This invention relates to improvements in pipe joints, and consists in the novel construction hereinafter disclosed.

An object of the invention is to provide a pipe joint of the flexible type which is adapted to withstand high pressure with provision whereby the joint is prevented from leaking under rapid changes in temperature or pressure.

Another object of the invention is to provide a pipe joint having relatively movable members, with a sealing gasket interposed between the members, together with pressure means for centering and seating the gasket.

Another object of the invention is to provide a flexible pipe joint having a sealing gasket arranged in association with the other parts so that there will be a minimum friction between the gasket and the contacting walls of the joint structure.

Figure 1:
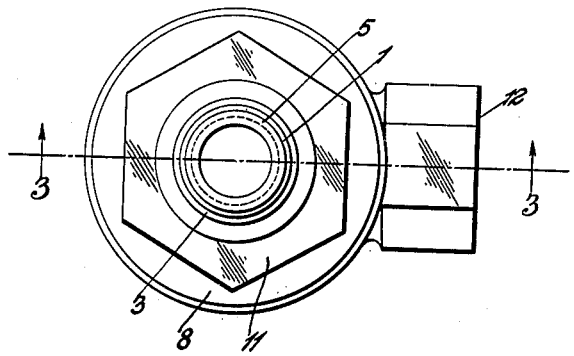
Figure 2:
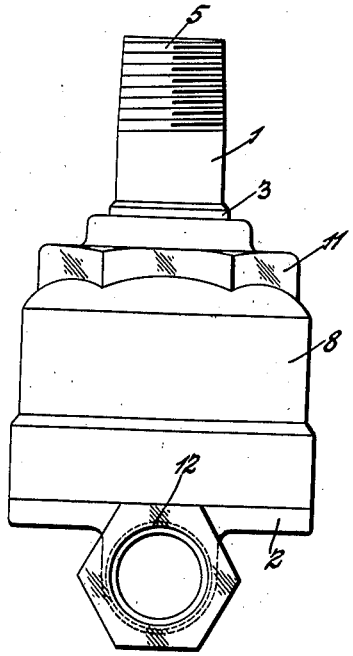
Figure 3:
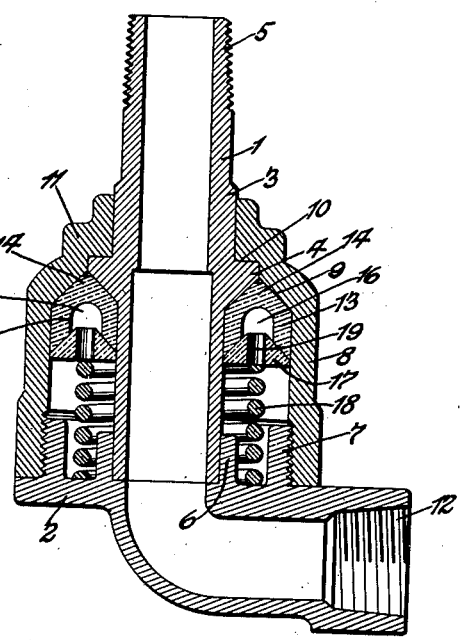

An additional object of the invention is to improve and simplify the construction of flexible pipe joints, the improvement in the structure being apparent from the following detailed description, taken in connection with the accompanying drawing, in which, Fig. 1 is a plan view.
Fig. 2 is a side elevation.
Fig. 3 is a vertical section on the line 3—3 of Fig. 1.

In the embodiment of the invention illustrated in the drawing, the pipe joint is shown as comprising coupling members 1 and 2. The member 1 is generally in cylindrical form and is provided with a slightly enlarged cylindrical portion 3 below which is a flange 4, said flange being formed with a horizontal upper wall and an inwardly inclined lower wall, thus providing a shoulder having an inclined face against which one wall of a gasket seats. The member 1 is preferably provided with an exteriorly threaded portion 5 whereby it may be connected with a pipe section.

The member 2, as shown in the drawing, is in the form of an elbow, although it will be understood that it may be made with a straight passage, if desired. An annular flange 6 has a diameter sufficient to receive in telescoping engagement the inner end of the member 1. The face of the member 2, intermediate the flange and the opening through the member, forms a shoulder against which the lower edge of the member 1 is seated. The face of the member 2 is provided with a second vertical flange 7 of annular form, which flange 7 is spaced inwardly from the edge of the face of the member 2 and is of a diameter in excess of the diameter of the flange 6, so that there is an annular space formed between said flanges 6 and 7 constituting a seat for a spring. The outer wall of the flange 7 is threaded and is adapted to receive a gland nut or connecting member 8, the lower end of which is threaded over the threaded portion of the flange 7. The member 8 is substantially V-shaped in form and has its upper inner wall 9 inwardly inclined, forming a matching surface with the undersurface of the shoulder 4 to provide a V-shaped channel for a gasket. The upper wall of the member 8 is offset to form a shoulder 10 that seats against the upper face of the flange 4 on the member 1. The external wall at the top of the member 8 is in the form of a polygonal nut 11 whereby the member may be engaged by a wrench or other tool for tightening the threaded connection between the member and the flange 7.

The member 2 at its outer extremity has an internally threaded portion 12 whereby it may be connected with a pipe section. A gasket 13 is formed with a V-shaped upper surface 14 with laterally spaced vertical side walls 15, the lower edges of which are inwardly tapered, the space between the walls forming a channel 16. The gasket 13 may be made of any suitable sealing material, preferably vulcanized rubber or other resilient compositions adapted to withsands wear.

The gasket 13 is seated in the V-shaped channel formed by the lower face of the shoulder 4 and the inclined wall 9 of the member 8 and is held in place by a ring 17, the upper face of which is oppositely inclined cooperating with the beveled edges of the vertical walls of the gasket. The ring 17 is arranged to exert pressure against the gasket in such a manner that the walls 15 are spread laterally into close contact with the adjacent surfaces of the member 1 and of the member 8, it being understood that the ring 17 is forced upwardly by a cylindrical expansion spring 18 seated between the ring and the face of the member 2, the spring being centered and held in position by being seated in the space between the flanges 6 and 7. The ring 17 is provided with a plurality of passages 19 extending vertically therethrough and serving to communicate the space below the ring with the channel formed in the gasket.

The lateral pressure and the upward pressure of the gasket is increased as the pressure in the pipe joint is increased by the fluid pressure that escapes between the pipe joint members by the pressure thus induced in the channel of the gasket. However, when the fluid pressure passing through the pipe joint is low, the mechanical pressure of the spring is sufficient to firmly seat the gasket and to prevent leakage through the joint between the member 1 and the member 8.

It will be understood that either the member 1 or the member 2 may be stationary and the other movable, or the members may be simply relatively movable to each other, each having a movement in connection with its respective pipe section. It will also be noted that the construction is designed so as to provide bearing surfaces for the relatively movable members, thus avoiding undue wear or friction on the gasket.

From the foregoing description of the construction, it will be apparent that it fully accomplishes the purposes above set out and that it may be economically manufactured and readily assembled. It will also be apparent that the fluctuation in pressure and temperature of the fluid passing through the joint will not cause the joint to leak under widely varying conditions of use.

I am aware that the invention may be modified in various particulars without departing from the spirit and scope thereof and I do not restrict myself to unessential details.

What I claim and desire to secure by Letters Patent is:—

1. A pipe joint comprising a cylindrical member, a circumferential shoulder on said member provided with an inclined face, a second member having a swivel connection with said first member, a connecting member having swivel engagement with said shoulder and provided with an inner wall portion inclined to meet the inclined face of said shoulder and forming therewith a substantially V-shaped seat at the joint between said first and said connecting members, a gasket having a substantially V-shaped extremity conforming to the seat formed between said first and connecting members and being also provided with an annular cavity in its opposite extremity having outwardly flared edges, a spreader ring having inclined faces seating against the outwardly flared edges of said gasket, and a spring interposed between said spreader ring and a wall of said second member for forcing the gasket into close contact with said V-shaped seat.

2. A pipe joint comprising two swiveled members, a circumferential shoulder on one of said members provided with an inclined face, a connecting member having swivel engagement with said shoulder and provided with an inner wall portion inclined to meet said inclined face of said shoulder and forming therewith a substantially V-shaped seat, a gasket having one extremity matching and fitting against said seat and having in its opposite extremity an annular cavity provided with outwardly flared edges, a spreader ring having one end matching and seating against said outwardly flared edges of said gasket, and a spring interposed between said spreader ring and the wall of the other swivel member than the one having said circumferential shoulder thereon.

3. A pipe joint comprising two tubular members having telescoping swivel connection, a circumferential shoulder on one of said members provided with an inclined face, a connecting member screwed on the other one of said tubular members and having swivel engagement with said shoulder and thereby holding said tubular members in abutting swiveled connection, said connecting member having an inner wall portion inclined to meet said inclined face of said shoulder and forming therewith a substantially V-shaped seat, a gasket having one extremity matching and fitting against said seat and having in its opposite extremity an annular cavity provided with outwardly flared edges, a spreader ring having one end matching and seating against said outwardly flared edges of said cavity, and a spring interposed between said spreader ring and said tubular member on which said connecting member is screwed.

BARNETT MORSE BROWNELL.